(12) United States Patent
Pinske

(10) Patent No.: US 6,390,159 B1
(45) Date of Patent: May 21, 2002

(54) DRILL PRESS AND SAW TABLE

(76) Inventor: Thomas G. Pinske, 919 Queen Ave., Glencoe, MN (US) 55336

(*) Notice: Subject to any disclaimer, the term of this patent is extended or adjusted under 35 U.S.C. 154(b) by 0 days.

(21) Appl. No.: 09/644,761

(22) Filed: Aug. 23, 2000

(51) Int. Cl.[7] ................................................. B27M 1/08
(52) U.S. Cl. ....................... 144/3.1; 29/26 A; 144/35.1; 144/218; 144/222; 144/368; 144/365; 144/356; 409/24; 409/29
(58) Field of Search ........................... 29/26 A; 144/1.1, 144/3.1, 35.1, 365, 367, 368, 375, 218, 222, 356, 382; 408/22, 24, 25, 26, 69

(56) References Cited

U.S. PATENT DOCUMENTS

| | | | |
|---|---|---|---|
| 2,593,745 A | * 4/1952 | Gillespie | 144/3.1 |
| 2,789,598 A | * 4/1957 | Berger | 408/25 |
| 2,923,330 A | * 2/1960 | Rozell | 408/29 |
| 3,483,904 A | * 12/1969 | Jacumin | 408/25 |
| 3,547,171 A | * 12/1970 | Jacumin | 144/368 |
| 3,570,565 A | * 3/1971 | Morgan | 408/26 |
| 4,071,060 A | * 1/1978 | Busch | 408/24 |
| 4,736,511 A | * 4/1988 | Jenkner | 144/35.1 |
| 5,553,645 A | * 9/1996 | Dorney | 408/26 |

OTHER PUBLICATIONS

The Pinske Edge, Jan. 2000 catalog.
Blum advertisement.

* cited by examiner

*Primary Examiner*—W Donald Bray
(74) *Attorney, Agent, or Firm*—Gerald E. Helget; Nelson R. Capes; BRIGGS AND MORGAN, P.A.

(57) ABSTRACT

An apparatus for automatically cutting a drawer slide groove and drilling a drawer-securing pin hole in a drawer with a bottom with a number of edges extending downwardly from the bottom, and a rear wall. The apparatus includes a support, the drawer resting on the support during the cutting and drilling operations; a power saw having a moving blade adapted for cutting a groove in the drawer; a first guide mounted on the support and adapted to engage one of the plurality of downwardly extending drawer edges, thereby positioning the saw blade adjacent the downwardly extending drawer edge; a drill carrier movable in a first direction and a second direction relative to the support; and a power drill mounted in the drill carrier and having a drill bit adapted to drill a drawer-securing pin hole in the rear wall of the drawer.

20 Claims, 13 Drawing Sheets

DRILL PRESS AND SAW TABLE

BACKGROUND OF THE INVENTION

The present application relates to a drill press and saw table for automatically cutting a groove in the base of a drawer for a drawer slide and simultaneously drilling a hole in the back of the drawer for a drawer-securing pin.

The Tandem™ drawer system from Julius Blum, Inc., Stanley, N.C., is very popular with kitchen cabinet makers. This system, shown in FIG. 1, consists of a telescoping drawer slide S and a pin P. The slide S mates with a groove G in the base of the drawer D, and the pin P mates with a hole H in the back of the drawer D, as shown in FIG. 2.

Previously, to adapt a drawer to work with this system, it was necessary to manually cut the groove G using a table saw and then use a separate drill press to drill the hole H. This was very time consuming and subject to error.

The present invention automatically cuts the groove G and the hole H in one step, greatly speeding up the process and essentially eliminating error.

SUMMARY OF THE INVENTION

An apparatus for automatically cutting a drawer slide groove and drilling a drawer-securing pin hole in a drawer, the drawer having a bottom with a plurality of edges extending downwardly from the bottom and a rear wall, the apparatus comprising:

a) a support, the drawer resting on the support during the cutting and drilling operations;

b) a power saw having a moving blade adapted for cutting a groove in the drawer;

c) a first guide mounted on the support and adapted to slidingly engage one of the plurality of downwardly extending drawer edges, thereby positioning the saw blade adjacent the downwardly extending drawer edge;

d) a drill carrier movable in a first direction and a second direction relative to the support; and e) a power drill mounted in the drill carrier and having a drill bit adapted to drill a drawer-securing pin hole in the rear wall of the drawer.

A principal object and advantage of the present invention is that it automatically cuts the groove for the drawer slide and drills the hole for the securing pin.

Another object and advantage of the present invention is that includes a rotary saw blade with a unique tooth construction to cut the groove.

Another object and advantage of the present invention is that it includes push buttons that, when pressed by the drawer, automatically position the drill at the correct position for drilling the hole.

Another object and advantage of the present invention is that the saw blade is not raised into cutting position until one of the push buttons is pressed, for safety reasons.

Another object and advantage of the present invention is that the drill is not activated until one of the push buttons is pressed, for safety reasons.

DETAILED DESCRIPTION OF THE PREFERRED EMBODIMENT

Figure 1:
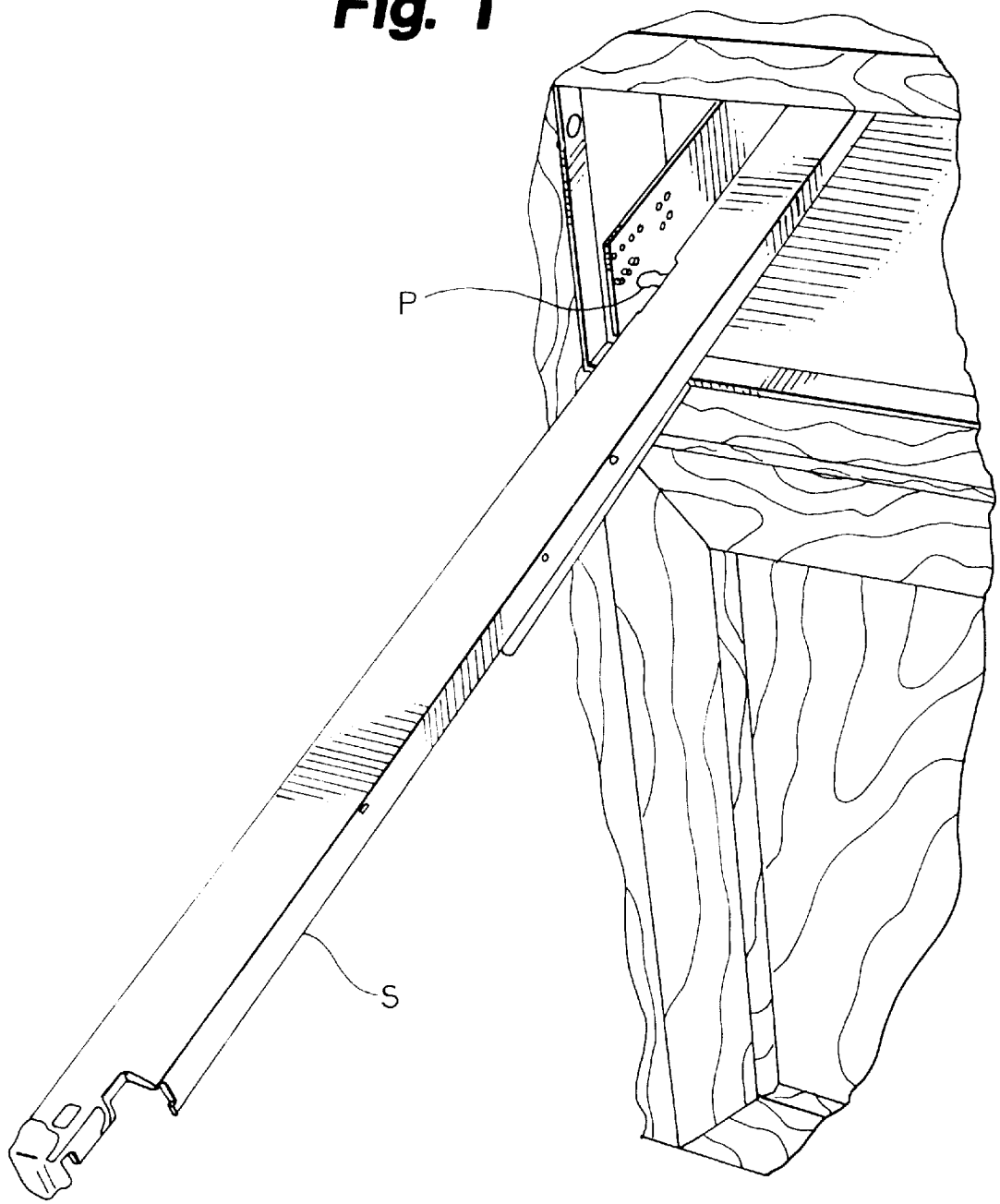
FIG. 1 is a perspective view of the special drawer hardware for which the present invention was designed.
Figure 2:
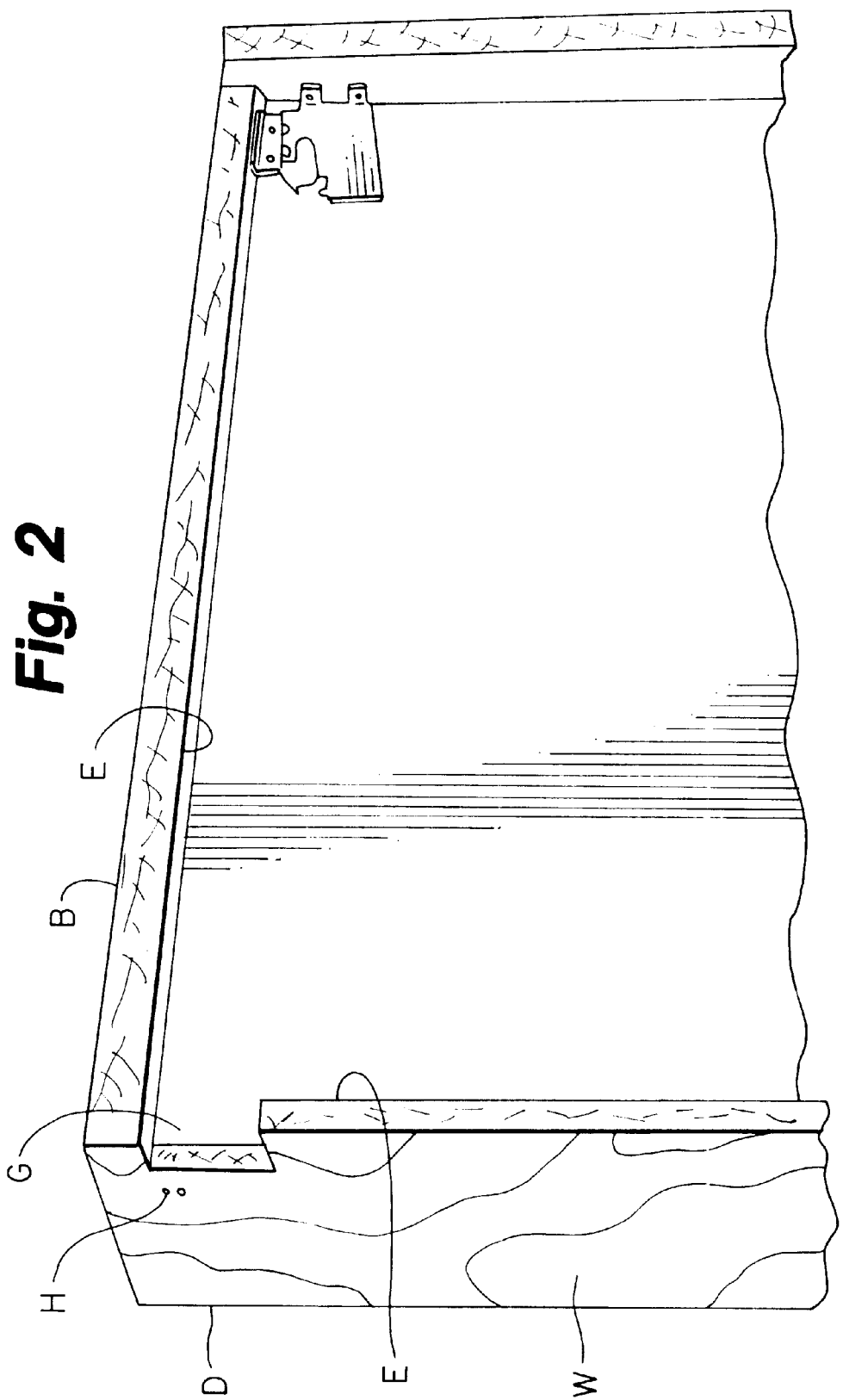
FIG. 2 is a perspective view of the bottom of a drawer, showing the groove and pin hole which are cut by the present invention.

The drawer system with which the present invention operates is shown in FIG. 1. This system, shown in FIG. 1, consists of a telescoping drawer slide S and a drawer-securing pin P. The slide S mates with a slide groove G in the base of the drawer D, and the pin P mates with a pin hole H in the back of the drawer D, as shown in FIG. 2. The drawer D had a bottom B with a plurality of edges E extending downwardly from the bottom, and a rear wall W.

Figure 3:
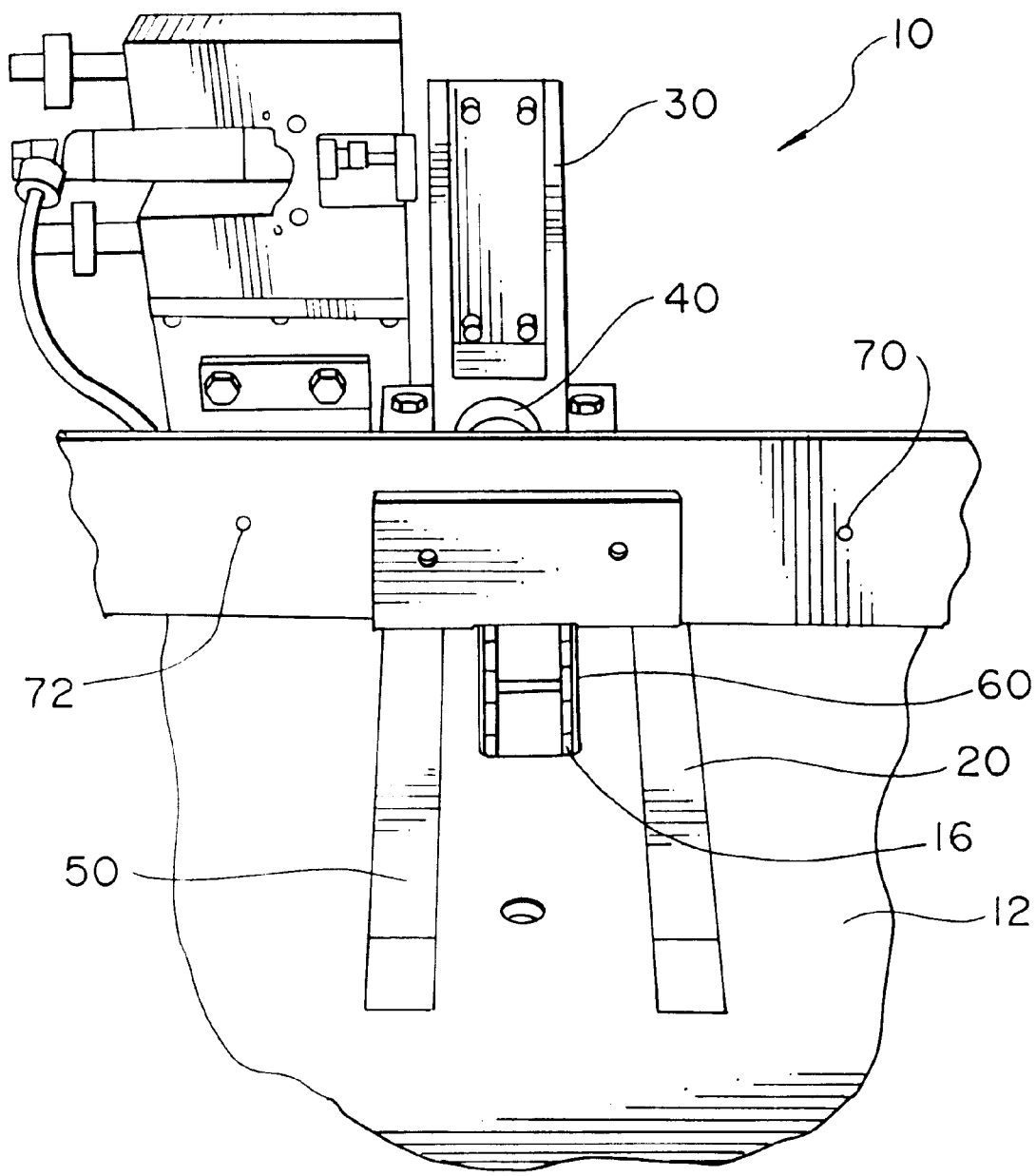
FIG. 3 is a front perspective view of the drawer support of the present invention.

The apparatus of the present invention is best shown in FIGS. 3- . As can be seen, the apparatus 10 comprises a support 12. The drawer D rests on the support 12 during the cutting and drilling operations described below.

The apparatus 10 further comprises a power saw 14 having a moving blade 16 adapted for cutting the groove G in the drawer D.

Figure 4:
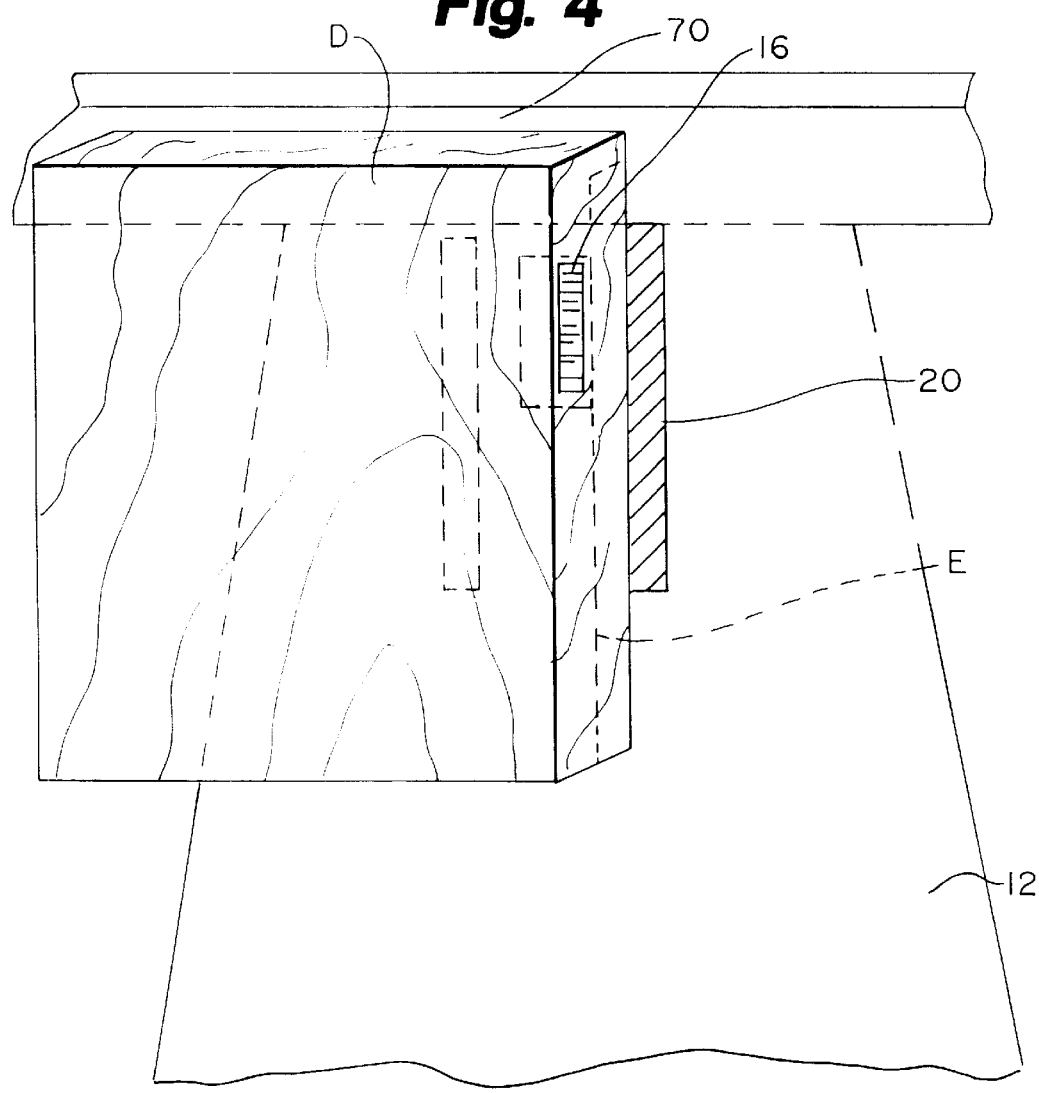
FIG. 4 is a top perspective view of the drawer support of the present invention, showing the drawer in place for the drilling and cutting operations.

As best seen in FIGS. 3 and 4, the apparatus 10 further comprises a first guide 20 mounted on the support 12. The first guide 20 is adapted to slidingly engage one of the downwardly extending drawer edges E, thereby positioning the saw blade 16 adjacent the downwardly extending drawer edge E.

Figure 5:
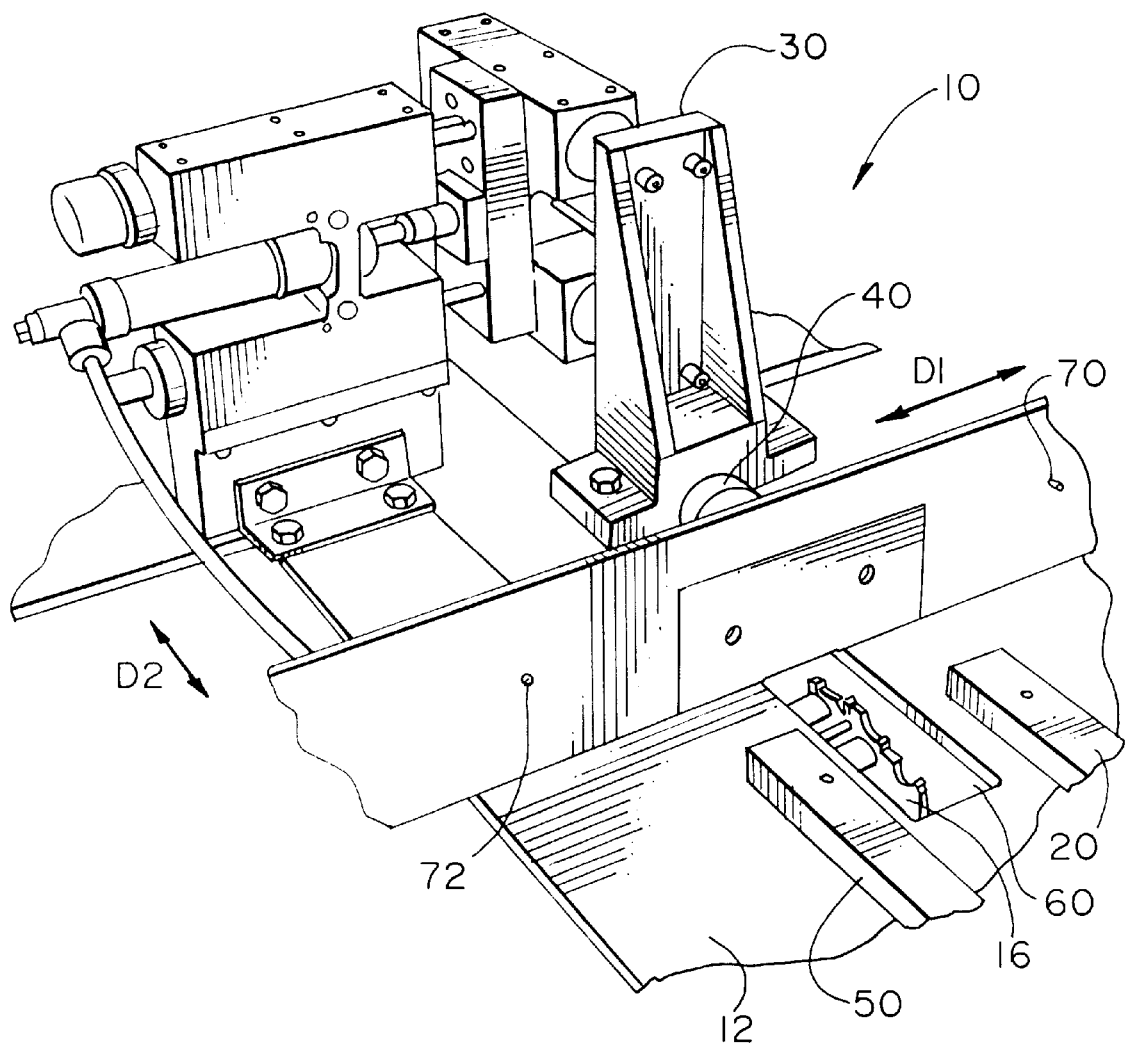
FIG. 5 is a perspective view of the drawer support and drill guide of the present invention.
Figure 6:
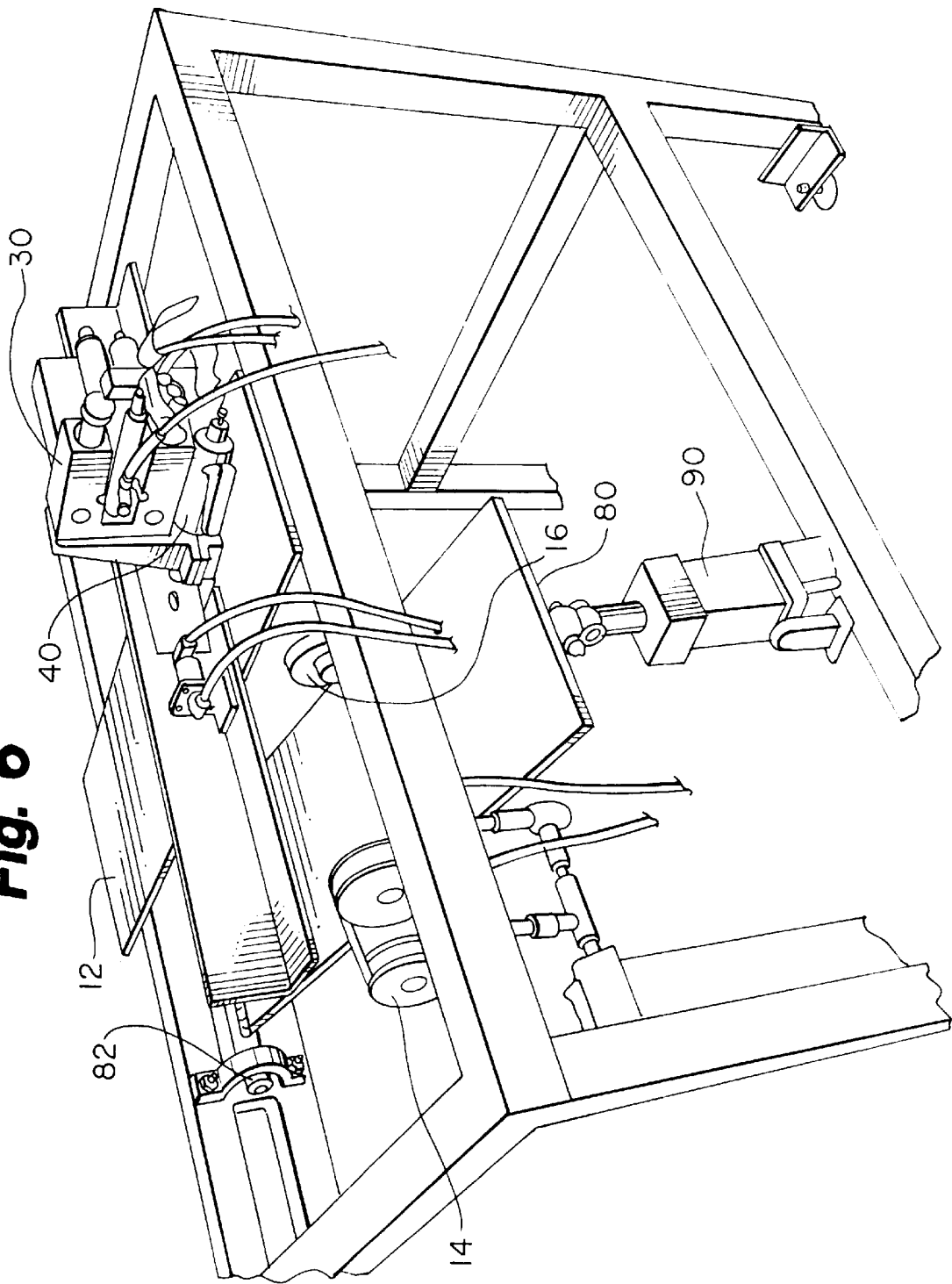
FIG. 6 is a rear perspective view of the present invention.
Figure 7:
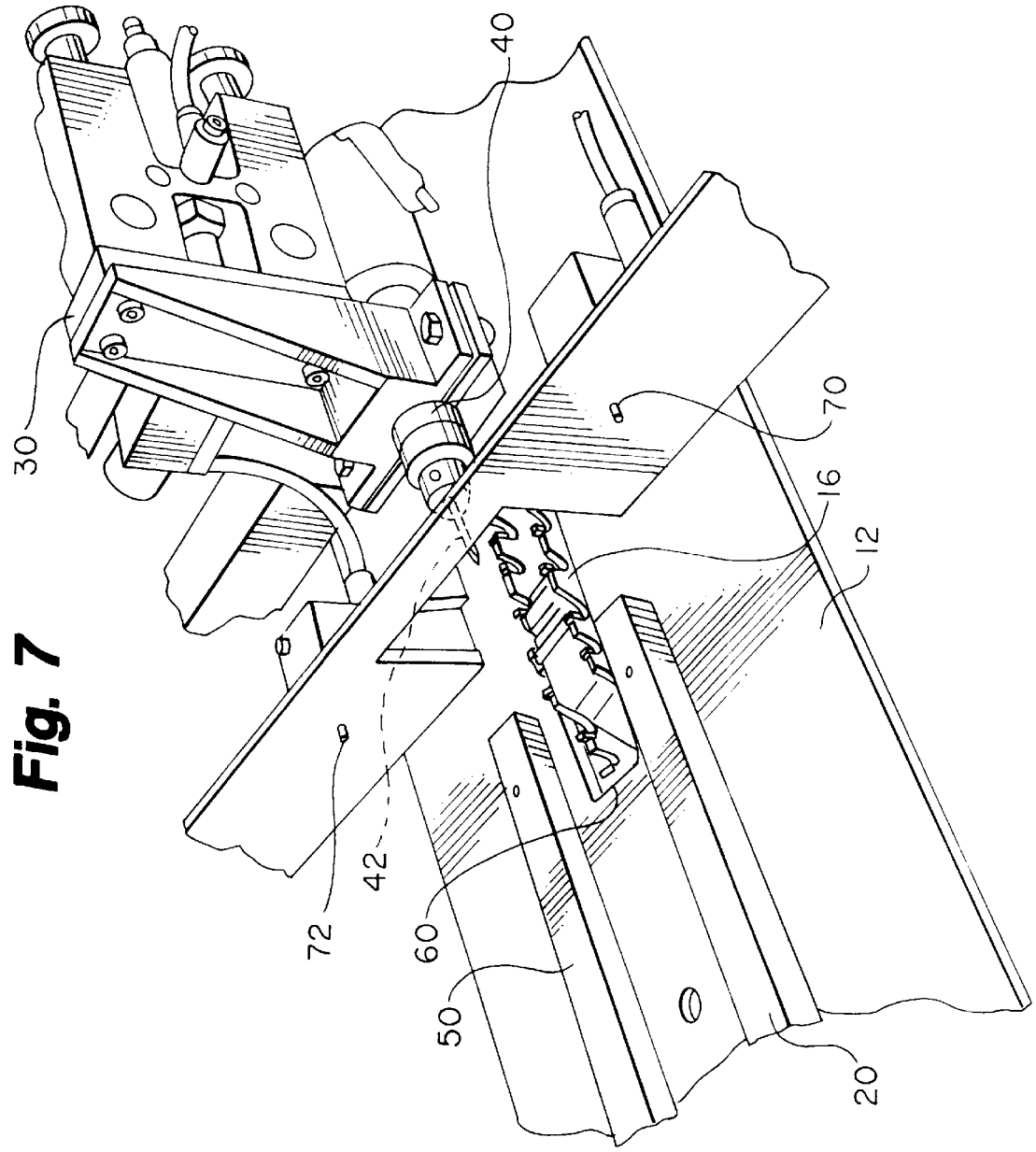
FIG. 7 is top perspective view of the drawer support, showing the saw blade in the saw blade cut-out.

As best seen in FIG. 5, the apparatus 10 further comprises a drill carrier 30. The drill carrier 30 is mounted on the apparatus 10 adjacent the support 12 in such a manner that the drill carrier 30 is movable in a first direction D1, essentially perpendicular to the saw blade 16, and in a second direction D2 essentially parallel to the saw blade 16.

A power drill 40 is mounted in the drill carrier 30 and had a drill bit 42 adapted to drill the drawer-securing pin hole H in the rear wall W of the drawer D.

The apparatus 10 preferably also comprises a second guide 50 mounted on the support 12 and spaced from the first guide 20. The saw blade 16 is positionable between the first guide 20 and the second guide 50. Preferably, the saw blade 16 is positioned between the first guide 20 and the second guide 50 through the saw blade cut-out 60 in the support 12.

The apparatus 10 also comprises a first switch 70 signaling the drill carrier 30 to move the drill 40 in the first direction D1 so that it is adjacent the first guide 20, and a second switch 72 signaling the drill carrier 30 to move the drill 40 in the first direction D1 so that it is adjacent the second guide 50.

Figure 8:
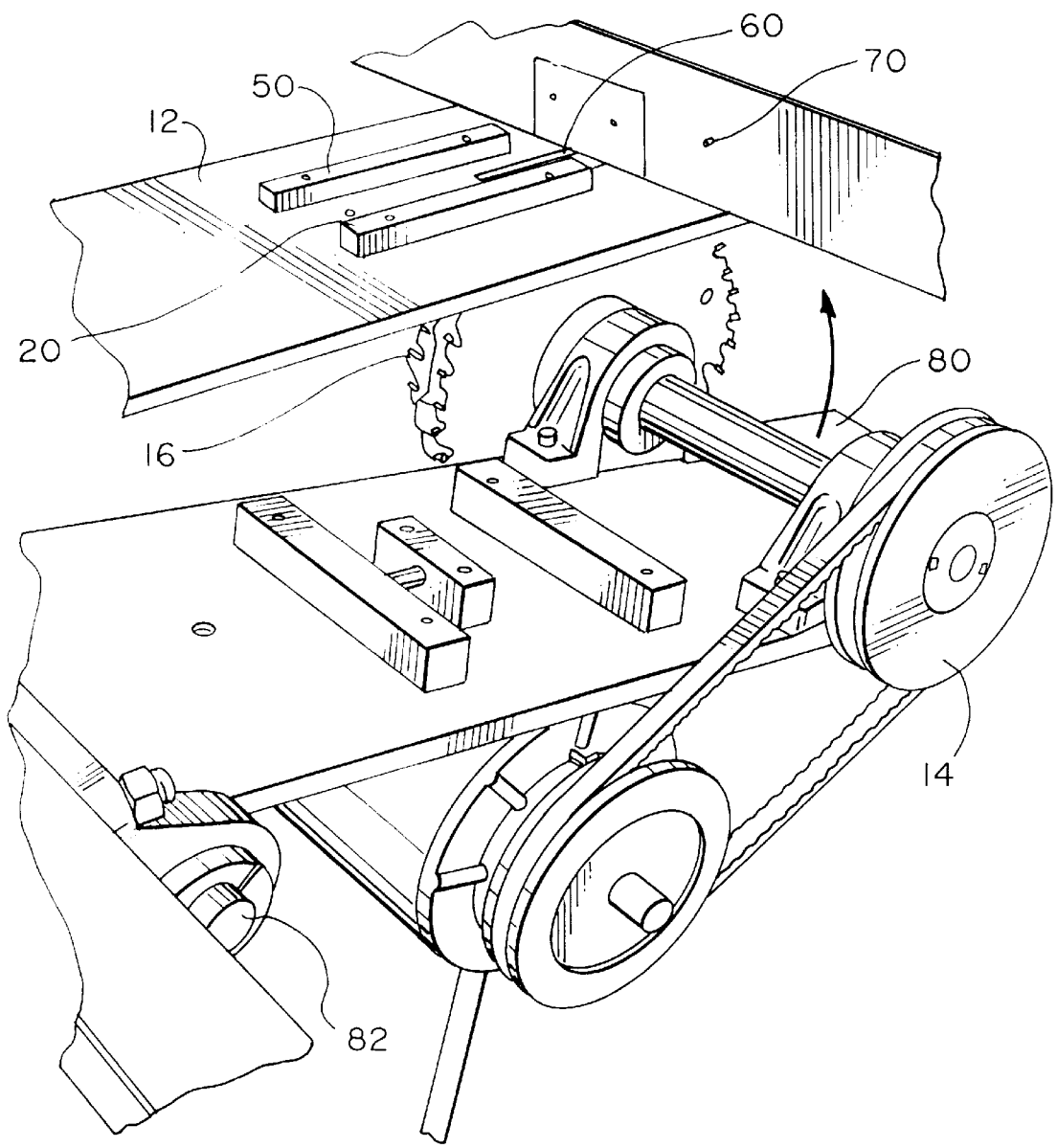
FIG. 8 is a top perspective view of the present invention, with the drawer support removed to show the saw support and associated hardware.
Figure 9:
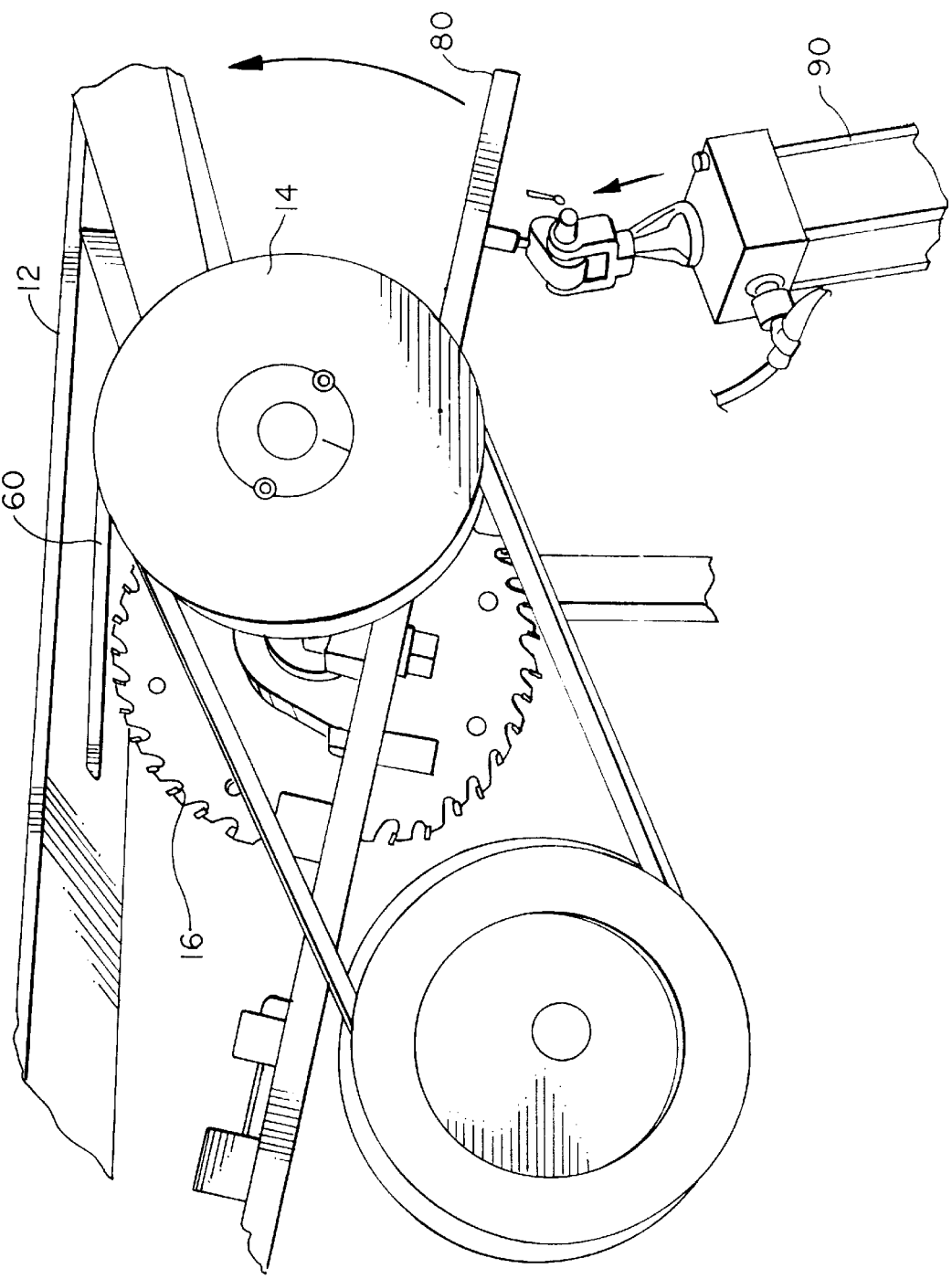
FIG. 9 is a left elevational view of the internal hardware of the present invention.
Figure 10:
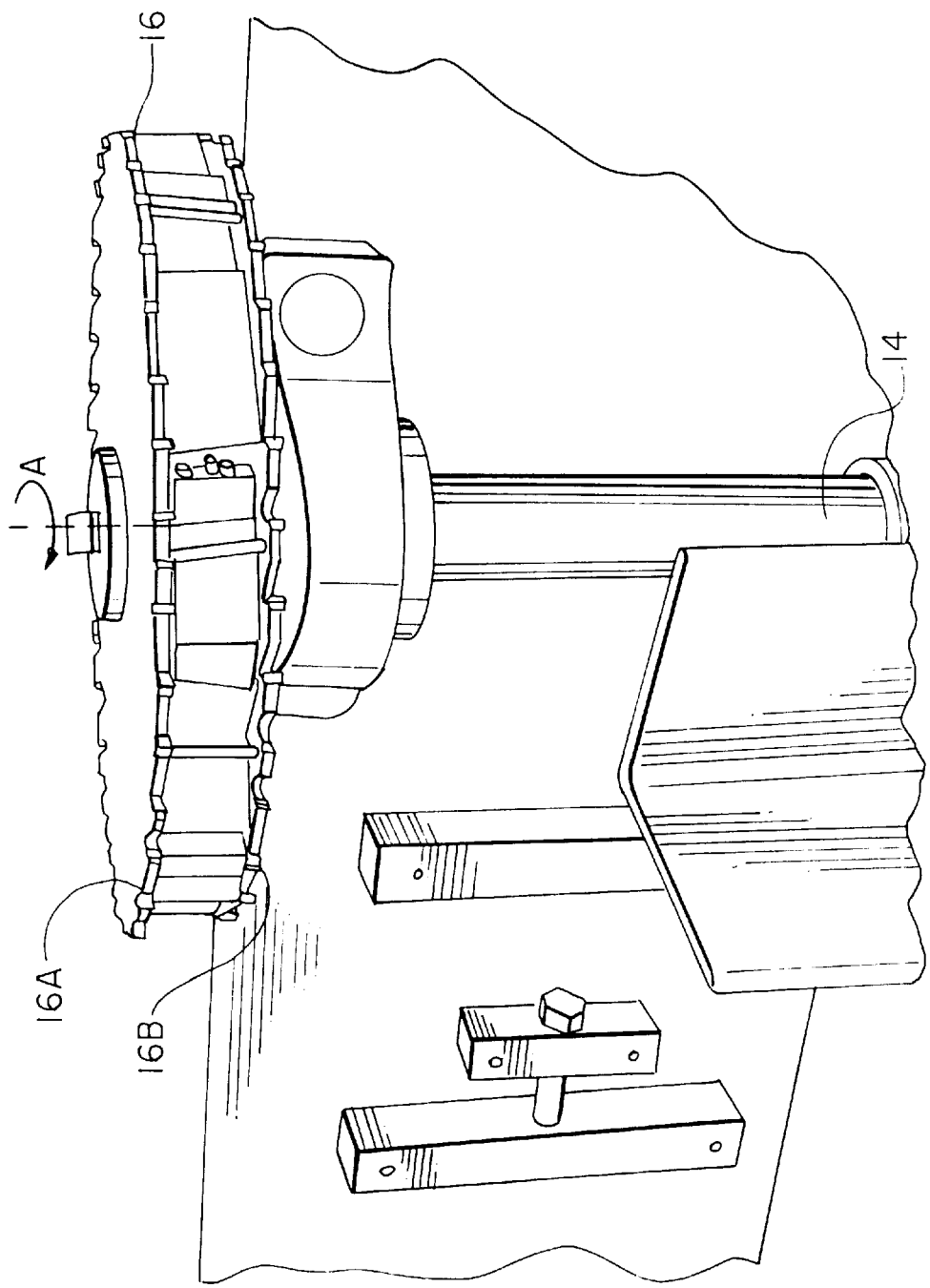
FIG. 10 is a top plan view of the rotary saw blade of the present invention.
Figure 11:
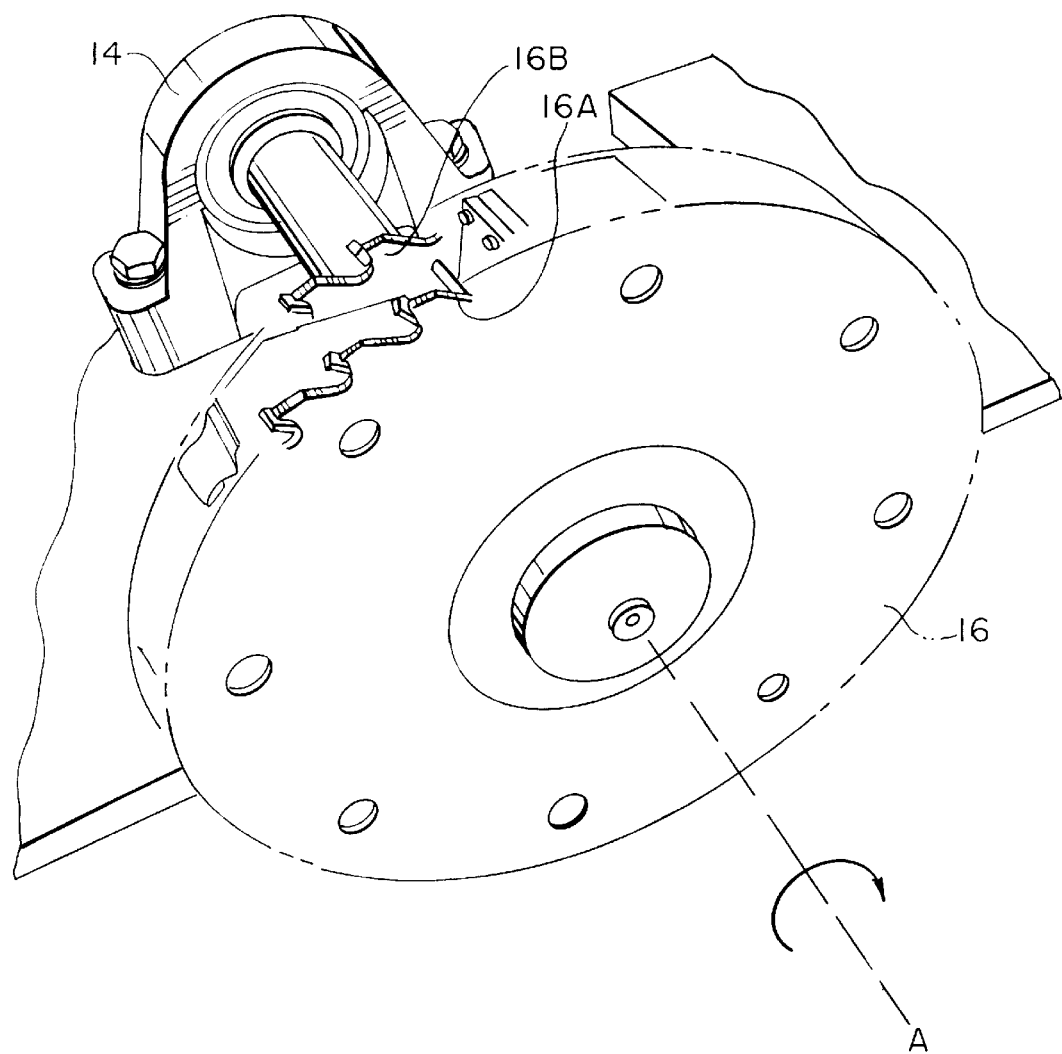
FIG. 11 is a perspective view of the rotary saw blade of the present invention.
Figure 12:
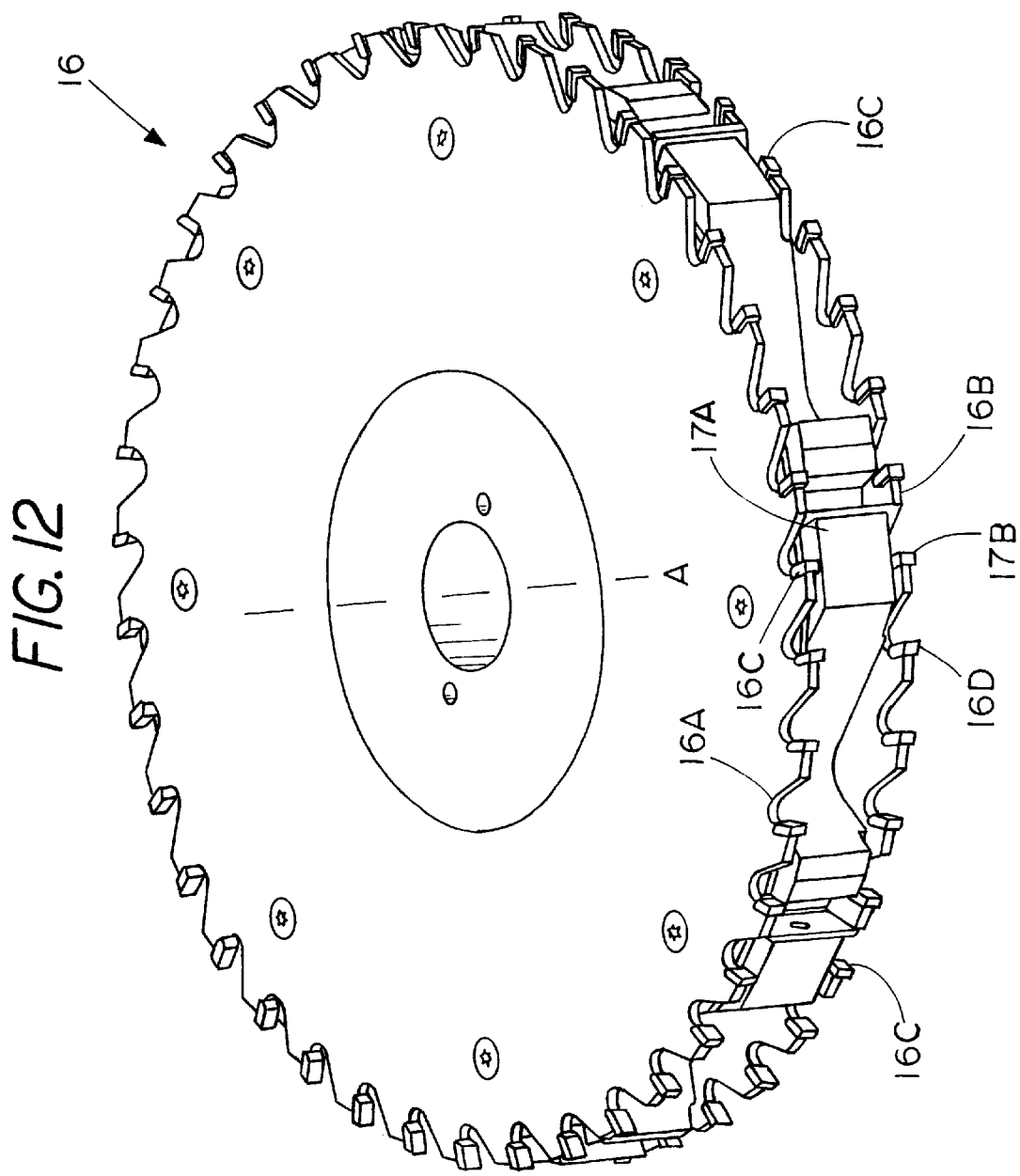
FIG. 12 is a schematic of the rotary saw blade of the present invention.

The apparatus 10 also comprises a movable saw support 80 on which the saw 14 is mounted. The movable saw support 80 positions the saw blade 16 in the saw blade cut-out 60. Preferably, the apparatus further comprises a hydraulic piston 90 adapted to move the movable saw support 80 toward and away from the saw blade cut-out 60. For example, as shown in FIG. 8, the movable saw support 80 may be hinged at one end by hinge pin 82 and the hydraulic piston 90 acts on the opposite end of the saw support 80.

The hydraulic piston 90 may be activated by a foot switch 100.

For safety reasons, it is desirable that the foot switch 100 not be active unless one of the first switch 70 and second switch 72 is depressed.

The saw blade 16 has some novel features which enhance the invention. Preferably, the saw 14 is a rotary saw and the blade 16 is substantially circular and rotates about an axis A and the blade 16 further comprises two sets of teeth 16a, 16b spaced from one another. One set of teeth 16a will cut one side of the groove G and the other set 16b cuts the other side of the groove G.

For best cutting, the saw blade 16, further comprises a first subset 16c with cutting edges 17a substantially parallel to the axis A and a second subset 16d with cutting edges 17b at an acute angle to the axis A. The set 17a prevents the groove G from becoming V-shaped.

Operation of the apparatus 10 may now be described.

First, the operator lays the drawer D on the support 12 with the bottom B facing the support 12 and one of the downwardly extending edges E contacting the first guide 20. The drawer is then pushed along the support 12 until it contacts the first switch 70. This causes the apparatus 10 to activate the drill carrier 30 to move the drill 40 adjacent the first guide 20 to a position for drilling a hole H in the rear wall W of the drawer D at the correct position to mate with the draw-securing pin in the drawer hardware. Then the drill carrier 30 moves the drill 40 toward the drawer D so that the bit 42 drills the hole H.

Contact of the drawer D with the first switch 70 also allows the foot switch 100 to be activated. When the operator steps on the foot switch 100, the hydraulic piston 90 is activated, causing the movable saw support 80 to move the saw 14 toward the support 12, with the blade 16 going through the cut-out 60 and cutting the groove G in the drawer D.

The operator then releases pressure on the foot switch 100, causing the moving saw support 80 to lower the saw 14 away from the support 12.

The operator then turns the drawer D through 180 degrees so that the opposite downwardly extending edge contacts the second guide 50, and pushes the drawer against the second switch 72, causing the drill carrier 30 to move the drill 40 adjacent the second guide 50 to a position for drilling the other hole H in the drawer, and moving the drill 40 toward the drawer H to drill the hole H.

The operator then steps on the foot switch 100 and repeats the sawing operation described above.

Figure 13:
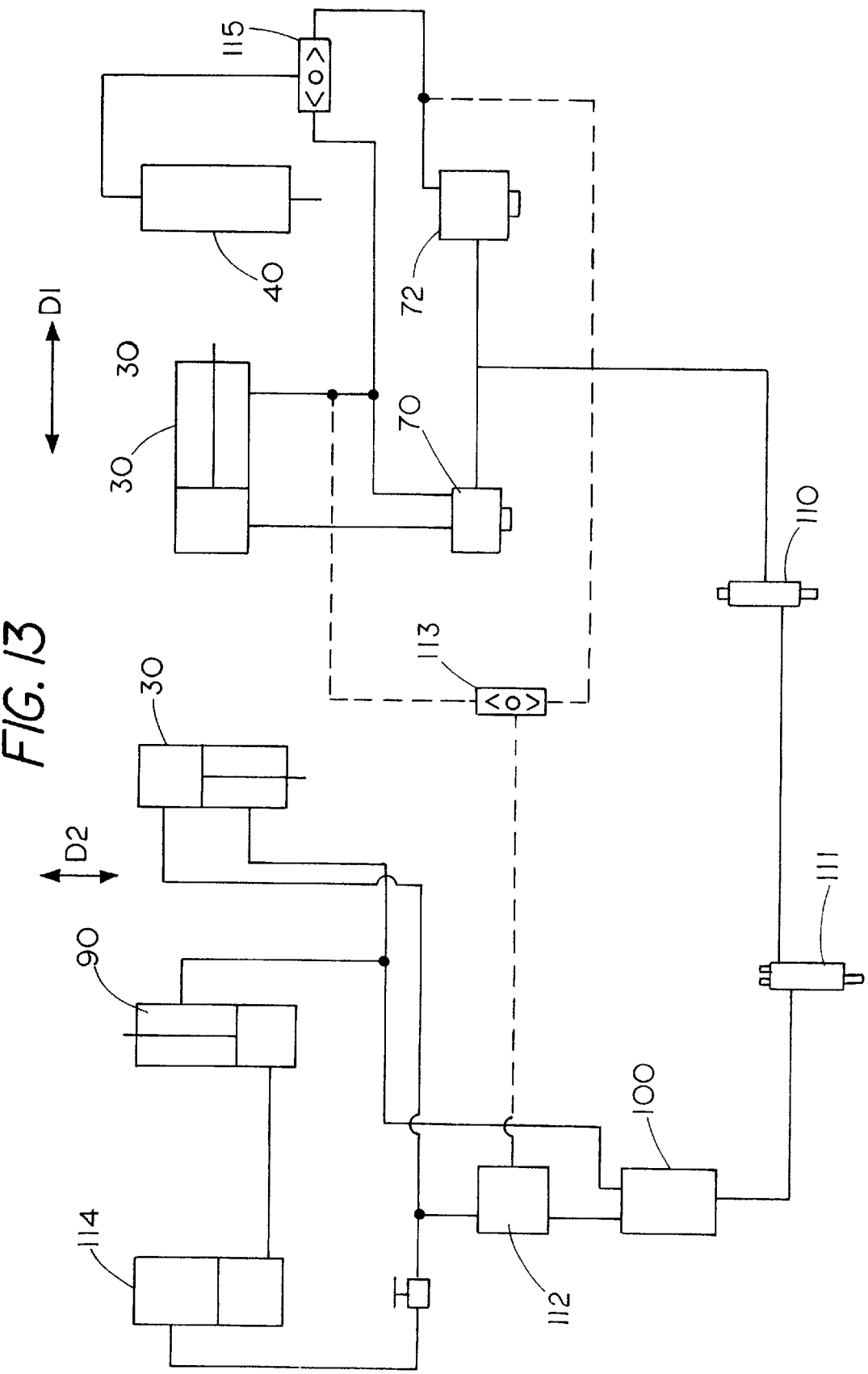
FIG. 13 is a schematic of the air control system of the present invention.

The control system for the foot switch 100, saw support 80, first switch 70, second switch 72, and drill carrier 30 is shown in FIG. 13, and consists of a source of compressed air (not shown) and regulators and valves necessary to control the various components.

As shown in FIG. 13, both of the first switch 70 and second switch 72 are connected to a regulator 110, and connect to the drill carrier 30 and drill 40 for movement in the first direction D1, essentially perpendicular to the saw blade 16. The first switch 70 and second switch 72 may also activate the drill 40 through shuttle switch 115, if the drill is pneumatic.

The first switch 70 and second switch 72 also connect to a three-way switch 112 which is normally closed, through shuttle valve 113. When either the first switch 70 or second switch 72 is closed, the shuttle valve 113 causes the three-way switch 112 to open, allowing the foot switch 100 to be active. The foot switch receives air from the second regulator 111. Activation of the foot switch 1 00 then activates the hydraulic piston 90 through the three-way switch 112 and oil/air reservoir 114. Activation of the foot switch 100 also activates the drill carrier 30 through the three-way switch 112 to move the drill 40 in the second direction D2 toward the saw blade 16, thereby drilling the hole H in the back of the drawer D.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for automatically cutting a drawer slide groove and drilling a drawer-securing pin hole in a drawer, the drawer having a bottom with a plurality of edges extending downwardly from the bottom and a rear wall, the apparatus comprising:
   a) a support, the drawer resting on the support during the cutting and drilling operations;
   b) a power saw having a moving blade adapted for cutting a groove in the drawer;
   c) a first guide mounted on the support and adapted to slidingly engage one of the plurality of downwardly extending drawer edges, thereby positioning the saw blade adjacent the downwardly extending drawer edge;
   d) a drill carrier movable in a first direction and a second direction relative to the support; and
   e) a power drill mounted in the drill carrier and having a drill bit adapted to drill a drawer-securing pin hole in the rear wall of the drawer.

2. The apparatus of claim 1, further comprising a second guide mounted on the support and spaced from the first guide.

3. The apparatus of claim 2, wherein the saw blade is positionable between the first guide and the second guide.

4. The apparatus of claim 3, wherein the support further comprises a saw blade cut-out adapted for positioning the saw blade between the first guide and the second guide.

5. The apparatus of claim 1, wherein the saw is a rotary saw and the blade is substantially circular and rotates about an axis and the blade further comprises two sets of teeth spaced from one another.

6. The apparatus of claim 8, wherein the saw blade further comprises a first subset with cutting edges substantially parallel to the blade's axis of rotation and a second subset with cutting edges at an acute angle to the blade's axis of rotation.

7. The apparatus of claim 4, further comprising a first switch signaling the drill carrier to move the drill in the first direction adjacent the first guide and a second switch signaling the drill carrier to move the drill in the first direction adjacent the second guide.

8. The apparatus of claim 7, further comprising a movable saw support adapted to position the saw blade in the saw blade cut-out.

9. The apparatus of claim 8, further comprising a hydraulic piston adapted to move the movable saw support toward and away from the saw blade cut-out.

10. The apparatus of claim 9, further comprising a foot switch adapted to activate the hydraulic piston.

11. The apparatus of claim 10, wherein one of the first switch and the second switch activates the foot switch.

12. An apparatus for automatically cutting a drawer slide groove and drilling a drawer-securing pin hole in a drawer, the drawer having a bottom with a plurality of edges extending downwardly from the bottom and a rear wall, the apparatus comprising:

a) a support, the drawer resting on the support during the cutting and drilling operations;
  b) a power saw having a moving blade adapted for cutting a groove in the drawer;
  c) a first guide mounted on the support and adapted to slidingly engage a first of the plurality of downwardly extending drawer edges, thereby positioning the saw blade adjacent the first downwardly extending drawer edge;
  d) a second guide mounted on the support and spaced from the first guide, the second guide being adapted to slidingly engage a second of the plurality of downwardly extending drawer edges, thereby positioning the saw blade adjacent the second downwardly extending drawer edge;
  e) the support having a saw blade cut-out between the first guide and second guide, the saw blade being positionable in the saw blade cutout;
  f) a drill carrier movable in a first direction and a second direction relative to the support; and
  g) a power drill mounted in the drill carrier and having a drill bit adapted to drill a drawer-securing pin hole in the rear wall of the drawer.

13. The apparatus of claim 12, wherein the saw is a rotary saw and the blade is substantially circular and rotates about an axis and the blade further comprises two sets of teeth spaced from one another.

14. The apparatus of claim 13, wherein the saw blade further comprises a first subset with cutting edges substantially parallel to the blade's axis of rotation and a second subset with cutting edges at an acute angle to the blade's axis of rotation.

15. The apparatus of claim 12, further comprising a first switch signaling the drill carrier to move the drill in the first direction adjacent the first guide and a second switch signaling the drill carrier to move the drill in the first direction adjacent the second guide.

16. The apparatus of claim 15, further comprising a movable saw support adapted to position the saw blade in the saw blade cut-out.

17. The apparatus of claim 16, further comprising a hydraulic piston adapted to move the movable saw support toward and away from the saw blade cut-out.

18. The apparatus of claim 17, further comprising a foot switch adapted to activate the hydraulic piston.

19. The apparatus of claim 18, wherein one of the first switch and the second switch activates the foot switch.

20. An apparatus for automatically cutting a drawer slide groove and drilling a drawer-securing pin hole in a drawer, the drawer having a bottom with a plurality of edges extending downwardly from the bottom and a rear wall, the apparatus comprising:

a) a support, the drawer resting on the support during the cutting and drilling operations;
  b) a power saw having a moving blade adapted for cutting a groove in the drawer;
  c) a first guide mounted on the support and adapted to slidingly engage a first of the plurality of downwardly extending drawer edges, thereby positioning the saw blade adjacent the first downwardly extending drawer edge;
  d) a second guide mounted on the support and spaced from the first guide, the second guide being adapted to slidingly engage a second of the plurality of downwardly extending drawer edges, thereby positioning the saw blade adjacent the second downwardly extending drawer edge;
  e) the support having a saw blade cut-out between the first guide and second guide, the saw blade being positionable in the saw blade cut-out, a movable saw support adapted to position the saw blade in the saw blade cut-out, a hydraulic piston adapted to move the movable saw support toward and away from the saw blade cut-out, a foot switch adapted to activate the hydraulic piston;
  f) a drill carrier movable in a first direction and a second direction relative to the support, a first switch signaling the drill carrier to move the drill in the first direction adjacent the first guide and a second switch signaling the drill carrier to move the drill in the first direction adjacent the second guide, wherein one of the first switch and the second switch activates the foot switch; and
  g) a power drill mounted in the drill carrier and having a drill bit adapted to drill a drawer-securing pin hole in the rear wall of the drawer.

* * * * *